Figure 1:
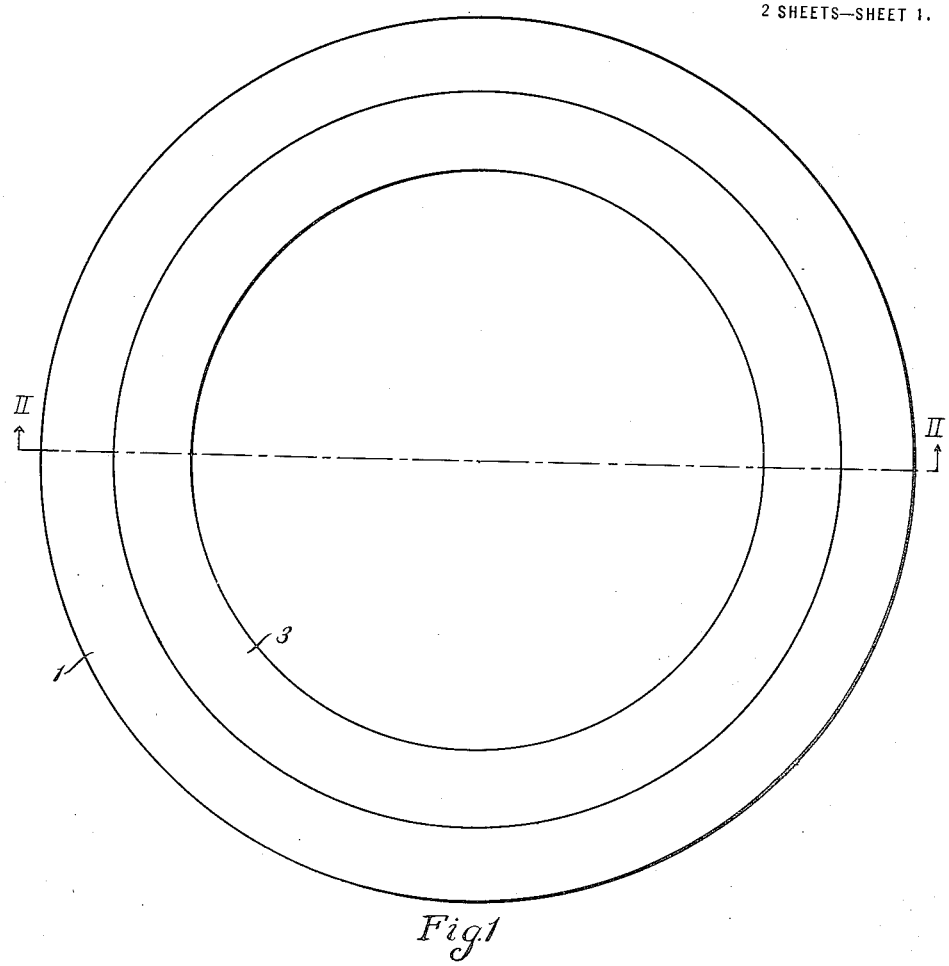

W. H. KEMPTON.
COMPOSITE ARTICLE.
APPLICATION FILED AUG. 10, 1918.

1,309,758.

Patented July 15, 1919.
2 SHEETS—SHEET 1.

WITNESSES:
W. S. Reece
W. H. Woodman.

INVENTOR
Willard H. Kempton
BY
Wesley G. Carr
ATTORNEY

W. H. KEMPTON.
COMPOSITE ARTICLE.
APPLICATION FILED AUG. 10, 1918.

1,309,758.

Patented July 15, 1919.
2 SHEETS—SHEET 2.

WITNESSES:
W. S. Reece
W. H. Woodman.

INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE ARTICLE.

1,309,758.

Specification of Letters Patent. Patented July 15, 1919.

Original application filed June 28, 1918, Serial No. 242,499. Divided and this application filed August 10, 1918. Serial No. 249,349.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Composite Articles, of which the following is a specification, this being a division of application Serial No. 242,499, filed June 28, 1918.

My invention relates to composite articles and it has for its primary object to provide an article composed of two or more different molding compositions and which may be molded at a single operation.

Oftentimes, it is very desirable that various parts of an article shall possess different qualities and, in many instances, such articles are of a character which will permit of being formed by molding. Heretofore, it has been the practice, under such circumstances, to mold the several parts as separate elements and to then assemble the parts by an adhesive or other suitable means to form the complete article.

An example showing the desirability of forming articles having certain portions of one material and other portions of another will readily occur to anyone skilled in the molding art. For instance, in some articles it is necessary that a certain portion or portions have unusually high dielectric properties while the remaining portions need not have such properties or may require ability to withstand the heat of flash-overs and arcs. Again, with some articles, the main body of the article need not possess as great strength as that required in certain portions of the article and, under such circumstances, oftentimes, the main body may be formed of a more economical composition than the portions requiring strength. Furthermore, in some instances certain portions of an article must possess extremely high wearing properties while the remaining portions are in no way subject to wear.

To insure a clear understanding of my invention, I have disclosed a method by which articles having different portions of their bodies formed of different molding compositions may be quickly, economically and efficiently formed and molded, as a unit, in a single operation.

Obviously, although many kinds of molding compositions or materials may be employed and wide changes in the combinations thereof, in a single article, may be made to obtain the best results, certain broad principles should be adhered to. For example, the various molding compositions or materials employed should all be susceptible of being cured under the same treatment or, at least, the treatment required for one of the materials should be such as to insure the curing of all the other materials employed. Furthermore, the materials employed should be of such nature that the coefficients of expansion of the materials, when they are cured, will be substantially the same in order that there shall be no tendency toward distortion of the article, either during its curing or while it is in use. In addition to these features, in most instances it is desirable that the various materials employed be of such relative natures that they will unite with each other to form strong joints between the several portions of the article.

In the drawings, in which corresponding reference numerals indicate like parts throughout the several views, I have illustrated two quite different examples of articles which may be constructed by practising my invention, the first of these being a barrier ring for alternating-current motors and the second, a bushing for electrical insulating purposes.

Figure 2:
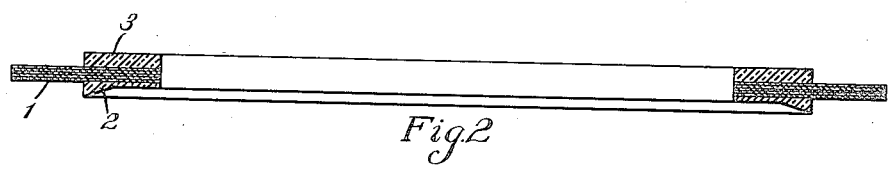
Figure 5:
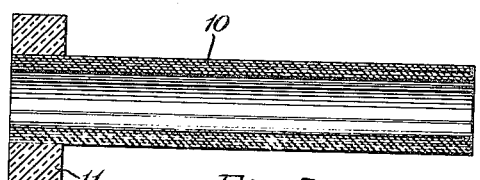
Figure 3:
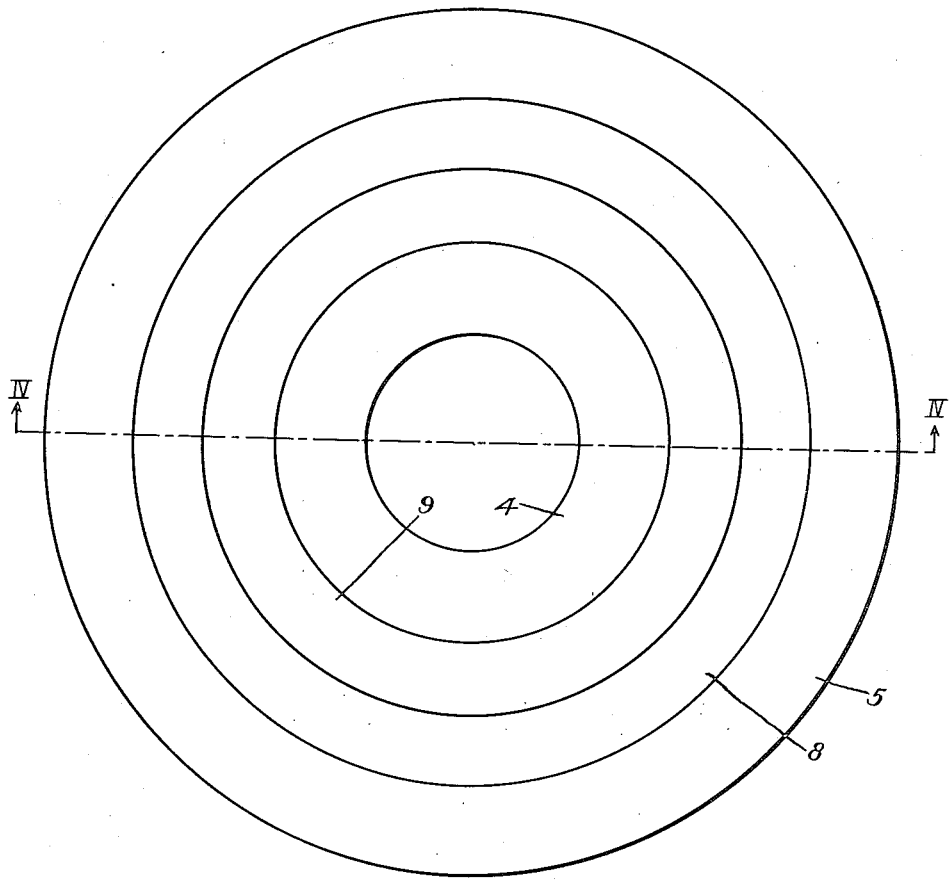
Figure 4:
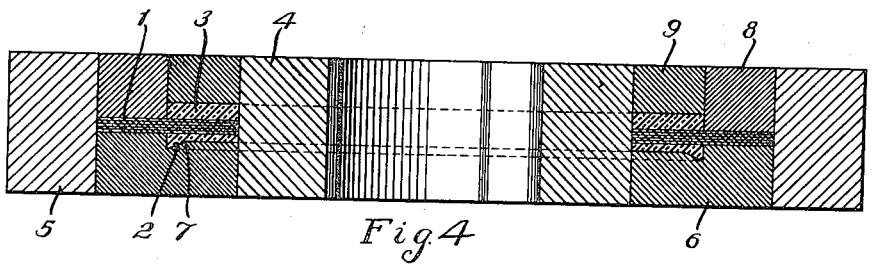

In the drawings, Figure 1 is a plan view of a barrier ring constructed in accordance with my invention; Fig. 2 is a sectional view taken on the line II—II of Fig. 1; Fig. 3 is a plan view of one form of mold which may be employed in making the barrier ring; Fig. 4 is a central vertical sectional view, taken on the line IV—IV of Fig. 3, showing a barrier ring within the mold and Fig. 5 is a central longitudinal sectional view of a bushing constructed in accordance with my invention.

In constructing alternating current motors, barrier rings are sometimes interposed between the contact rings and must possess certain insulative and flash-over or arc-resisting properties. With large motors, it has been found that the inner portions of these barrier rings must possess extremely high dielectric qualities while the outer portions of the ring need not possess such qualities to as great an extent but must be capable of withstanding flash-overs and arcs. Difficulty has been met with in obtaining a desirable material possessing both of these properties and it, therefore, seems advisable to construct the barrier rings of different materials.

In Figs. 1 and 2, I have illustrated a barrier ring comprising an annular body 1 made up of superimposed layers of fibrous material impregnated with a binder. The fibrous material which may preferably be employed is sheet asbestos, and the binder may be a phenolic condensation product, such as bakelite, which will harden under the action of heat and pressure. Secured against the opposite sides of the annular body 1 are rings 2 and 3 of a different material, these rings being of the same internal diameter as the body 1 but of less external diameter so that the periphery of the body 1 projects considerably beyond them. These rings may be formed of any suitable molding material having high dielectric properties, such as wood flour impregnated with a suitable binder as, for instance, a phenolic condensation product.

In practising my invention, the body is formed and positioned without being cured in a suitable mold with a sufficient amount of the other molding material to form the rings after which the body thus assembled is cured in any suitable manner, as by subjecting it to the action of heat and pressure, if the binder be a phenolic condensation product.

By this means, a unitary article is provided, the several portions of which possess different qualities. The body portion, being of sheet asbestos and a hardened phenolic condensation product, is capable of resisting flash-overs and arcs while the remaining portions of the barrier ring, being of wood flour and a phenolic condensation product, possess unusually high dielectric properties.

In Figs. 3 and 4, I have illustrated a form of mold which may be employed in practising my invention. As there shown, the mold comprises inner and outer body-forming rings 4 and 5 which are concentrically disposed with respect to each other and between which is disposed a bottom-forming wall or ring 6 upon which may be placed the sheet material 1 of the barrier ring. The upper surface of this bottom ring 6 is formed with an annular recess 7 corresponding to the portion 2 of the barrier ring and adapted to receive the material of which said portion is made. Coöperating with these mold sections are the outer and inner pressure rings 8 and 9, the former of which is adapted to engage the marginal portion of the sheet material 1 and the latter of which is adapted to mold the material 3.

The manner of molding the barrier ring will be readily appreciated by reference to Fig. 4 of the drawings. The inner and outer wall-forming rings 4 and 5 and the bottom-forming ring 6 are disposed in operative relation, sufficient material for the formation of the portion 2 of the barrier ring is then placed upon the recessed portion of the ring 6, the desired quantity of stacked sheet material is placed in the mold, the pressure ring 8 is applied, sufficient additional molding material to form the part 3 of the barrier ring is placed in the mold, the pressure ring 9 is applied and pressure is simultaneously applied to the pressure rings 8 and 9 to compact the materials placed in the mold and bring them to proper shape. Heat is applied to the mold simultaneously with the pressure and is continued for such length of time as to insure that the assembled barrier-ring structure within the mold shall be fully compacted and hardened to form a strong unitary body.

In Fig. 5 I have illustrated a simple type of bushing which may be constructed in accordance with my invention and which comprises a tubular body 10 provided, at one end, with an external annular collar 11. The body 10 may be formed of any suitable fibrous sheet material, such as paper or fabric impregnated with a suitable binder, as, for instance, a phenolic condensation product, the sheet material being wound about a proper mandrel or core to form a tube having a wall of desired thickness. When this has been done, the tube is placed in a properly shaped mold, together with sufficient molding material of a different character to form the collar 11, and is there subjected to heat and pressure to shape and solidify both the tube and collar to form a unitary article. Any suitable molding material may be used for the formation of the collar 11 which will be cured by the same treatment as that required to cure the tubular body portion 10. For instance, a shredded material, such as asbestos, may be employed or a finely divided comminuted material, such as wood flour, may be used, together with a suitable binder, such as a phenolic condensation product.

From the foregoing description, it will be apparent that I have provided a system of multiplex molding which permits of the employment of two or more molding compositions in the formation of a single unitary article. It will further be apparent that this permits the employment of molding compositions having different characteristics of mechanical strength, dielectric strength and heat-withstanding capacity. I have further illustrated a method by which unitary bodies may be molded at a single operation in which portions of the body are formed of laminated fibrous or fabricated sheet material impregnated with a binder while other portions may be formed of a finely divided, comminuted, agglomerated or shredded filler impregnated with a suitable binder. Shellac, copal, casein and other binders may be employed instead of a phenolic condensation product if desired.

A hard, rigid non-yielding article is formed by reason of the character of the binder employed and the process of curing utilized although, as will be noted, the binder employed is initially inactive and is rendered active only by the curing of the assembled article.

Although I have illustrated but two examples of articles, constructed in accordance with my inventive process, and although I have set forth the employment of a phenolic condensation product, such as bakelite, for a binder and utilization of paper and asbestos and wood flour as fillers, it will be appreciated that numerous other binders and fillers may be empolyed to form various articles. For this reason, no limitations are to be imposed upon my invention other than those set forth in the claims.

I claim as my invention:

1. A hard and rigid composite molded article comprising agglomerated material, a non-metallic laminated material of relatively great tensile strength and a heat-hardened binder intimately associated with and uniting said materials.

2. A hard and non-yielding composite molded article comprising an agglomerated, comminuted material, a non-metallic material of relatively great tensile strength and a hardened binder intimately associated with and hardening and uniting said materials.

3. A hard and rigid composite molded article comprising an agglomerated, comminuted material, a fabricated material, and a common binder intimately associated with and hardening and uniting the said materials.

4. A hard and rigid composite molded article comprising an agglomerated, comminuted material, a sheet fibrous material and a common binder intimately associated with and hardening and uniting the said materials.

5. A hard and non-yielding composite molded article comprising an agglomerated material, a plurality of layers of fibrous material and a common heat-hardened binder intimately associated with and uniting the said materials.

6. A hard and non-yielding composite molded article comprising localized portions of a shredded or comminuted material and a fabricated material and a common hardened binder intimately associated with and hardening and uniting the said materials.

In testimony whereof, I have hereunto subscribed my name this 7th day of August, 1918.

WILLARD H. KEMPTON.